United States Patent
Radak et al.

(10) Patent No.: US 10,106,331 B2
(45) Date of Patent: Oct. 23, 2018

(54) METHOD FOR CONTROLLING THE MOVEMENT OF A TRANSPORTATION UNIT

(71) Applicant: B&R INDUSTRIAL AUTOMATION GMBH, Eggelsberg (AT)

(72) Inventors: Alexander Radak, Ebenau (AT); Stefan Huber, Salzburg (AT)

(73) Assignee: B&R INDUSTRIAL AUTOMATION GMBH, Eggelsbeerg (AT)

(*) Notice: Subject to any disclaimer, the term of this patent is extended or adjusted under 35 U.S.C. 154(b) by 0 days.

(21) Appl. No.: 15/424,011

(22) Filed: Feb. 3, 2017

(65) Prior Publication Data

US 2017/0225900 A1    Aug. 10, 2017

(30) Foreign Application Priority Data

Feb. 5, 2016  (AT) ............... A 50074/2016

(51) Int. Cl.
  *B65G 43/00*   (2006.01)
  *B60L 13/03*   (2006.01)
  *B65G 54/02*   (2006.01)

(52) U.S. Cl.
  CPC .......... *B65G 43/00* (2013.01); *B60L 13/03* (2013.01); *B65G 54/02* (2013.01); *B65G 2811/0673* (2013.01)

(58) Field of Classification Search
  CPC . B65G 43/00; B65G 54/02; B65G 2811/0673
  (Continued)

(56) References Cited

U.S. PATENT DOCUMENTS

| 5,136,217 A | 8/1992 | Hoffmann et al. |
| 6,087,790 A | 7/2000 | Fischperer |

(Continued)

FOREIGN PATENT DOCUMENTS

| DE | 197 23 233 | 12/1997 |
| DE | 10 2007 012 686 | 9/2008 |

(Continued)

OTHER PUBLICATIONS

Europe Office Action conducted on counterpart Europe Appln. No. 17152340.0-1809 (dated Jun. 17, 2017) (w/ machine translation).

*Primary Examiner* — Kyle O Logan
(74) *Attorney, Agent, or Firm* — Greenblum & Bernstein, P.L.C.

(57) ABSTRACT

In order to be able to plan and control the movement of a transportation unit of a conveying device along a conveying line more easily and more quickly, provision is made so that at least part of the conveying line (2) is assigned at least one logical sector (LSi), wherein the at least one logical sector (LSi) is allocated to one or more conveying segments (FSi) or parts thereof, a movement profile for the transportation unit (TEi) is allocated to the at least one logical sector (LSi), the transportation unit (TEi) is moved in accordance with the specified movement profiles along the at least one logical sector (LSi) and in doing so a new setpoint (S) of the movement is ascertained in each cycle step of the setpoint selection, and the setpoint (S) is transferred via the allocation to one or more conveying segments (FSi), or parts thereof, to the allocated conveying segment(s) (FSi) for adjustment.

15 Claims, 3 Drawing Sheets

(58) Field of Classification Search
USPC .......................................................... 700/230
See application file for complete search history.

(56) References Cited

U.S. PATENT DOCUMENTS

| | | | |
|---|---|---|---|
| 8,863,669 B2 * | 10/2014 | Young | B60L 15/005 |
| | | | 104/292 |
| 8,996,161 B2 | 3/2015 | Wernersbach et al. | |
| 2013/0035784 A1 * | 2/2013 | Wernersbach | B61L 27/04 |
| | | | 700/230 |

FOREIGN PATENT DOCUMENTS

| | | |
|---|---|---|
| EP | 0 456 239 | 11/1991 |
| JP | H08-37707 | 2/1996 |

* cited by examiner

… …

METHOD FOR CONTROLLING THE MOVEMENT OF A TRANSPORTATION UNIT

CROSS-REFERENCE TO RELATED APPLICATIONS

The present application claims priority under 35 U.S.C. § 119(a) of Austria Patent Application No. A50074/2016 filed Feb. 5, 2016, the disclosure of which is expressly incorporated by reference herein in its entirety.

BACKGROUND OF THE INVENTION

1. Field of the Invention

The invention relates to a method for controlling the movement of a transportation unit of a conveying device in the form of a long-stator linear motor, wherein the transportation unit is moved along a conveying line and the conveying line is composed of a number of conveying segments.

2. Discussion of Background Information

The invention relates to a conveying device in the form of a long-stator linear motor, in which a multiplicity of transport units is moved along a defined conveying line. A multiplicity of driving coils is arranged along the conveying line, which driving coils can be individually actuated in order to generate a moving magnetic field. The moving magnetic field cooperates with exciting magnets, generally permanent magnets, on a transportation unit so as to move the transportation unit in accordance with the motor principle. Such conveying devices have long been known, for example from U.S. Pat. No. 8,996,161 B2.

The movement profile of a transportation unit is planned in advance so as to accurately determine how the transportation unit shall move (for example position, speed, acceleration). In the case of a conveying device in the form of a long-stator linear motor, this can be rather complex, since a very large number of transportation units are generally moved simultaneously and the conveying line can comprise complex geometries, also including a number of line sections.

A conveying device generally consists of conveying segments which each comprise a number of driving coils, which are each controlled by an associated segment controller. The conveying segments are arranged adjacently so as to form the conveying line. A movement profile for a transportation unit, however, is normally planned over a number of conveying segments, and therefore a segment controller also has to implement just part of the movement profile. Only the relevant part of the movement profile can thus be transferred to each segment controller in order to control the transportation unit through the associated conveying segment. This, however, is very complex, in particular with a very large number of transportation units. Regardless of this, there are also specifications for the movement of the transportation unit with regard to the continuity of the movement. For example, acceleration jumps are undesirable and even must be frequently avoided. The planning of short movement profile sections, which are linked to one another and which are each controlled by different segment controllers in order to together give the overall movement profile, is also very complex, however, and is very difficult to realize.

U.S. Pat. No. 8,996,161 B2 describes a control architecture with which any drive axis can be controlled, in particular also a drive axis of a conveying device in the form of a long-stator linear motor having a series of conveying segments. Here, a movement profile for a drive axis (transportation unit) is planned by a user and the movement profile is then transferred to a control unit, which converts the movement profile into control commands for the corresponding driving coils of the conveying segments. The movement profile is planned here over a number of conveying segments and therefore does not have to be planned for individual conveying segments. The control unit ensures the implementation of the movement profile over the conveying segments. The movement profile is planned by means of standard software for any drive axes, wherein the specific implementation of the conveying line is also taken into consideration in the planning. The created movement profile for a transportation unit is thus linked to an implementation of the conveying line. Due to the identification of the conveying line, the control unit can then convert the movement profile over the conveying line into a movement of the transportation unit. This type of control architecture indeed facilitates the planning of the movement profile, because there is no longer any need for specific software, however it is still complex, since each drive axis must be planned separately in the specific implementation of the respective drive axes.

SUMMARY OF THE EMBODIMENTS

Embodiments of the present invention therefore are directed to a method with which a transportation unit of a conveying device can be planned and controlled more easily and more quickly.

Due to the use of logical sectors, the control of the movement can be decoupled completely from the underlying hardware (the conveying segments). The movement can thus be planned over abstract logical sectors, similarly to the control itself. The logical sector can be considered as a single linear axis, on which any movement profile can be implemented. The movement is performed over the logical sector, wherein the corresponding setpoint is implemented on the associated conveying segments of the hardware. The same logical sector can thus also be used in a simple way for different hardware. This also makes it possible to plan in advance logical sectors having associated movement profiles for any process independent of actual hardware and to integrate these logical sectors afterwards in an actual conveying device.

A logical sector can be easily handled when the logical sector has a starting point, an end point, and a length. Thus, only relative positions have to be taken into account, based on a starting point or end point, which can be easily realized. Here, it is advantageous when any position between starting point and end point of the logical sector corresponds to a unique position on an associated conveying segment. The allocation between logical sector and conveying segment is thus particularly simple.

It is particularly advantageous to allocate the logical sector one movement profile which is run through by each transportation unit on the logical sector. One movement profile is thus sufficient for all transport units. Alternatively, the logical sector can be allocated different movement profiles for different transportation units.

Travel through switches on the actual hardware can also be taken into consideration easily with the logical sectors when the allocation between the logical sector and a conveying segment also contains information regarding a necessary switch position. The logical sector does not have to worry about the travel through switches. The movement profile over the logical sector can also be planned without consideration of a switch. The concept is then implemented only on the actual hardware.

Other exemplary embodiments and advantages of the present invention may be ascertained by reviewing the present disclosure and the accompanying drawing.

BRIEF DESCRIPTION OF THE DRAWINGS

The present invention will be explained in greater detail hereinafter with reference to FIGS. 1 to 4, which show exemplary, schematic and non-limiting advantageous embodiments of the invention. In the drawings

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
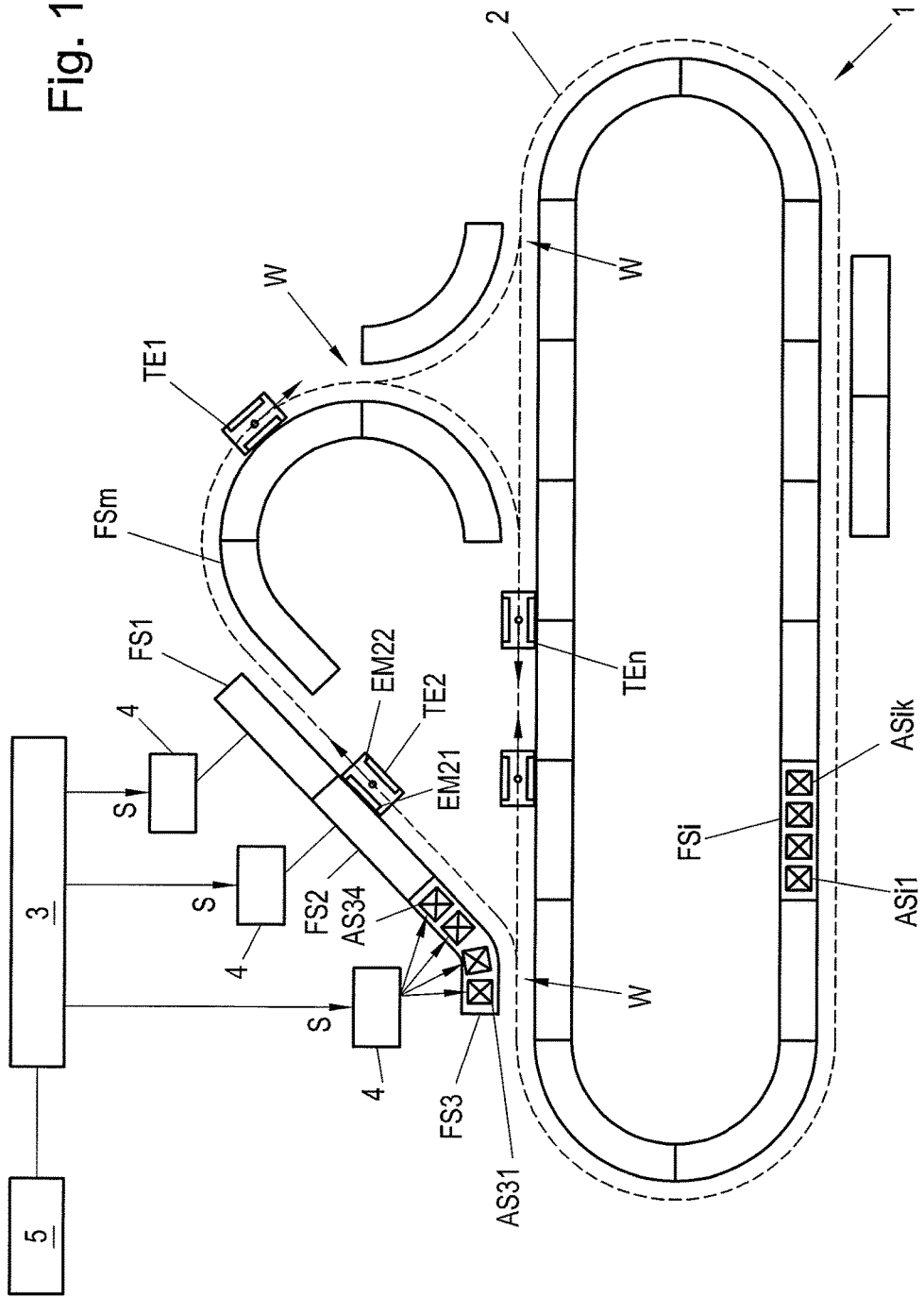
FIG. 1 shows an exemplary embodiment of a conveying device having conveying segments and a plurality of transportation units.

The invention relates to a conveying device 1 in the form of a long-stator linear motor, wherein a multiplicity of transportation units $TE_i$ is moved along a conveying line 2 of the conveying device 1. By way of example, an arbitrary design of a conveying device 1 with a conveying line 2 (indicated by the dashed line) is illustrated in FIG. 1. The conveying device 1 is embodied as a long-stator linear motor and a multiplicity of transportation units $TE_i$, $i=1, \ldots, x$ are provided, which can be moved along the conveying line 2. The conveying line 2 is defined substantially by the long stator of the long-stator linear motor 1. In the shown exemplary embodiment a series of conveying segments $FS_i$, $i=1, \ldots, y$ are provided, which define the path of the transportation units $TE_i$, i.e. the conveying line 2. The conveying segments $FS_i$ form part of the long stator of the long-stator linear motor. The conveying segments $FS_i$ are arranged in a stationary manner in a suitable design and generally also form guide elements, along which the transportation units $TE_i$ can be guided. Individual conveying segments $FS_i$, such as FS1 and FSM in FIG. 1, can also overlap one another in part, in particular at points of the conveying line 2 at which there is a transition from one line section to another line section. Provision can also be made so that conveying segments $FS_i$ are arranged in sections on both sides of the conveying line 2. Switches W can also be provided in order to provide transitions between different line sections. It is conceivable that a practically arbitrarily designed conveying line 2 can thus be formed, which also does not only have to be disposed in a two-dimensional plane, but can also extend three-dimensionally.

Each conveying segment $FS_i$ comprises a number k of driving coils $AS_{ij}$, $j=1, \ldots, k$, wherein the number k does not have to be the same in each conveying segment $FS_i$. In FIG. 1, only driving coils $AS_{ij}$ of some of the conveying segments $FS_i$ have been illustrated for reasons of clarity. Each transportation unit $TE_i$ comprises a number of exciting magnets $EM_{ij}$, $j=1, \ldots, l$, preferably on both sides (with respect to the conveying direction, which is indicated by the arrows on the transportation units $TE_i$) of the transportation unit $TE_i$. The driving coils $AS_{ij}$ cooperate with the exciting magnets $EM_{ij}$ of the transportation units $TE_i$ in accordance with the motor principle during operation of the conveying device 1, as is known. If the driving coils $AS_{ij}$ are energized with a coil current in the region of a transportation unit $TE_i$, a magnetic flux is created which in cooperation with the exciting magnets $EM_{ij}$ exerts a force onto the transportation unit $TE_i$. As is known, this force can comprise a force component forming a propulsion force and a force component forming a side force, depending on the coil current. The force component forming a propulsion force serves substantially to move the transport unit $TE_i$, and the force component forming a side force can be used to guide the transportation unit $TE_i$, but also to determine the path of the transportation unit $TE_i$ at a switch W. In this way, each transportation unit $TE_i$ can be moved individually and independently of one another along the conveying line 2 by energizing the driving coils $AS_{ij}$ with an appropriate coil current in the region of any transportation unit $TE_i$ in accordance with the movement to be performed.

This fundamental operating principle of a long-stator linear motor has long been known, and therefore it will not be discussed in greater detail. For the present invention, it is also irrelevant how the transportation units $TE_i$, the conveying segments $FS_i$, the driving coils $AS_{ij}$, the exciting magnets $EM_{ij}$, etc. are formed in terms of their specific structure, and therefore this also will not be discussed in greater detail.

In order to control the movement of the individual transportation units $TE_i$, a transportation unit control 3 is provided, in which the setpoints S for the movement of the transportation units $TE_i$, generally positions $p_i$, or equally also speeds $v_i$ or propulsion forces, are generated. Of course, a plurality of transportation unit controls 3 can equally also be provided, which are each allocated to a part of the conveying device 1, for example a line section formed of a number of conveying segments $FS_i$, and which control the movement of the transportation units $TE_i$ over this part. In addition, segment control units 4 can also be provided, which are allocated to a conveying segment $FS_i$ (or also a plurality of conveying segments $FS_i$ or also part of a conveying segment $FS_i$) and which convert the setpoint selections of the associated transportation unit control 3 for a transportation unit $TE_i$ into manipulated variables, for example into coil currents for the driving coils $AS_{ij}$ of the conveying segment $FS_i$. The segment control units 4, however, could also be implemented in a transport unit control 3. In a segment control unit 4, a suitable controller is therefore implemented which converts the setpoint selection of the setpoints S into a suitable manipulated variable for the drive, for example into a coil current.

The desired path of the transportation units $TE_i$ along the conveying line 2 can also be specified by a superordinate conveying device control 5, in which for example a route calculation (which path is to be taken by a transportation unit $TE_i$), a switch arbitration (which transportation unit $TE_i$ may travel into a switch), a deadlock avoidance (for example reciprocal blocking of two transportation units $TE_i$), etc. can be performed in order to move the transportation units $TE_i$ as desired along the conveying line 2, for example in order to realize a manufacturing, assembly or other process. This movement specification for the transportation units TEi can be converted in the transportation unit control 3 into setpoint selections for the transportation units TEi.

The movement of the transportation units TEi along the conveying line 2 is planned in advance. By way of example, there can be line sections of the conveying device 1 where manufacturing processes, handling processes, assembly processes and the like are performed on a component moved by means of a transportation unit TEi. The transportation unit TEi has to be moved for this purpose in this line section with a predefined movement profile (for example position p, speed v, acceleration a). Line sections can also be provided in which the transportation units TEi are to be moved as quickly as possible or must wait for other transportation units TEi or have to be synchronized to another transportation unit. Of course, many other specifications are also conceivable for a movement profile. In addition, a specific position of the conveying line 2, in particular in complex conveying lines 2 having many line sections and switches W, can often also be reached in different ways. All of this makes the movement planning for a transportation unit TEi of a conveying device 1 a complex task. The following approach is adopted in accordance with the invention in order to simplify this.

Figure 2:
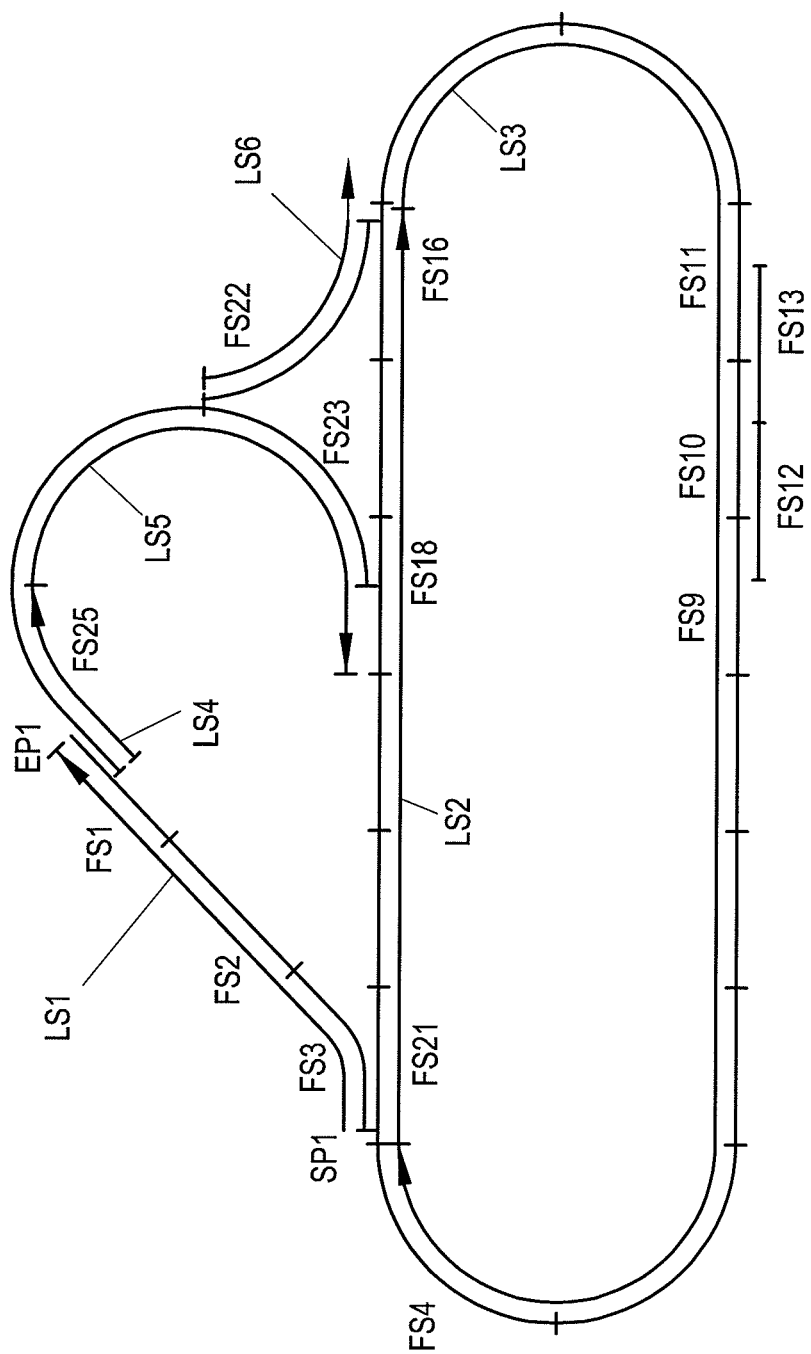
FIG. 2 shows logical sectors assigned to a conveying line.

Logical sectors LSi, i=1, . . . , z are defined along the conveying line 2 specified by the conveying device 1. In FIG. 2 the conveying line 2 of the exemplary embodiment according to FIG. 1 has been illustrated with twenty-five conveying segments FS1 . . . FS25, wherein only some of the logical sectors LSi have been illustrated by way of example.

It is irrelevant whether a logical sector LSi is composed of a number of conveying segments FSi or corresponds to exactly one conveying segment FSi. A logical sector LSi can also comprise parts of conveying segments FSi. The logical sectors LSi are planned independently of the corresponding hardware design of the conveying line 2, i.e. independently of the arrangement of the conveying segments FSi. The logical sectors LSi together cover all points of the conveying line 2 which are to be reached by the transportation units TEi. Closed paths do not necessarily have to be formed by the logical sectors LSi. If, however, the starting point and the end point of a logical sector LSi coincide, a closed logical sector LSi is provided.

A logical sector LSi can also be defined here on another logical sector. By way of example, a logical sector LSi can thus be divided into a plurality of logical sectors or can be composed of a plurality of logical sectors.

A logical sector LSi is defined by a starting point SPi and an end point EPi and a length L1 so as to be able to easily link together logical sectors LSi in order to be able to assign entire line sections or conveying lines 2 to logical sectors LSi. A logical sector LSi can therefore be defined uniquely by specification of the starting point SPi and end point EPi or by specification of the starting point SPi or end point EPi and the length Li. A conveying direction, as indicated by the arrows in FIG. 2, follows also from the starting point SPi and end point EPi. It is advantageous in the planning, but not imperative, when the starting point SPi and the end point EPi of the logical sector LSi match the starting point or end point of conveying segments FSi.

Figure 3:
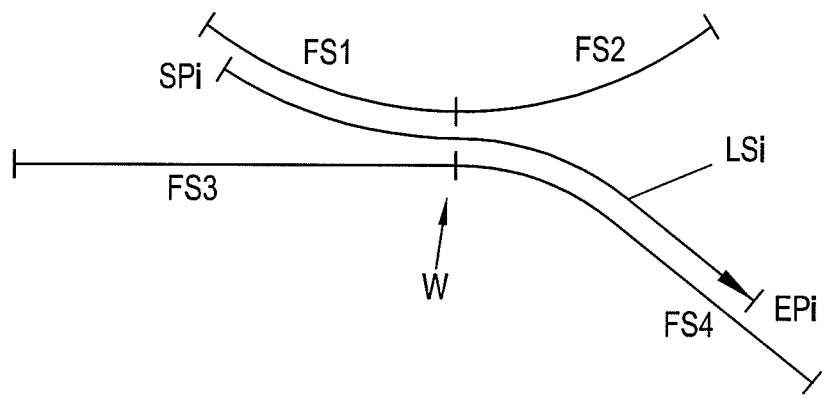
FIG. 3 shows a path along the conveying line, said path being defined by a logical sector.

A logical sector LSi consequently defines an abstract path along the conveying line 2 and is independent of the hardware (number and arrangement of the conveying segments FSi). A logical sector LSi can also be planned over switches W of the conveying device 1, as illustrated in FIG. 3. Here, two conveying segments FS1, FS2 are provided, which form a first line section, and two further conveying segments FS3, FS4, which form a second line section. The two line sections are connected to one another by a switch W, i.e. a transportation unit TEi can be moved at the switch W either along the first or second line section. The logical sector LSi comprises part of the conveying segment FS1 of the first line section and part of the conveying segment FS4 of the second line section. There is thus a change of the line section along the logical sector LSi.

Any movement profile can then be programmed on the logical sector LSi, regardless of the specific hardware (conveying segments FSi). A simple movement profile could be a speed ramp or a constant speed profile, for example. However, just an end point of the movement, for example the end point of the logical sector LSi, can also be specified, which is to be travelled to with any movement profile. Complex movements in which also more than one transportation unit TEi can be involved can also be defined. By way of example, a plurality of transportation units TEi can be moved jointly in a logical sector LSi in accordance with a specified movement.

A movement profile is defined for each transportation unit TEi moved along the logical sector LSi. Different movement profiles can also be defined for different transportation units TEi. However, the same movement profiles can also be defined for transportation units TEi. This can also be implemented by planning a movement profile for a logical sector LSi and by assigning this movement profile to a transportation unit TEi which travels into the logical sector and then runs through the movement profile. The movement profile of the logical sector LSi would thus be independent of a specific transportation unit TEi. Different movement profiles can of course be specified on a logical sector LSi, one of which is then assigned to a transportation unit TEi depending on a specified selection criterion. By way of example, a movement profile could be defined for an empty and a loaded transportation unit TEi so as to travel through a bend with the logical sector LSi, wherein a loaded transportation unit TEi is moved more slowly through the bend than an empty transportation unit.

However, logical sectors LSi can also be created and stored in advance independently of hardware. By way of example, a logical sector LSi is created for the filling of bottles. Here, bottles are moved along a specific movement profile through the logical sector LSi. Such predefined logical sectors LSi can then also be used to assign logical sectors LSi to the conveying line 2. By way of example, the logical sector LS1 in FIG. 2 could be defined as bottle filling. To this end, the previously created logical sector for bottle filling can be called up from a sector library and can be added to the sector planning. The same predefined logical sector can thus of course also be used a number of times in the planning. By way of example, the logical sector LS2 in FIG. 2 could also be planned as the same bottle filling.

In this way, part of the conveying line 2 of a conveying device 1 or an entire conveying line 2 of a conveying device 1 can be assigned logical sectors LSi without having to take into consideration the specific hardware of the conveying device 1.

Logical sectors LSi could even be planned dynamically during the operation of a conveying device 1. By way of example, it may be required to move a transportation unit TEi from one point P1 on the conveying line 2 to another point P2 on the conveying line 2. A path planning can now be implemented which searches for a path from point P1 to point P2. The path planning occurs on the basis of the conveying segments FSi. The found path from point P1 to point P2 is then defined as a logical sector LSi. In order to move the transportation unit TEi, a movement profile is then planned for this logical sector LSi or a suitable movement profile, for example constant speed of travel, is taken from a library and assigned to the logical sector LSi.

The movement of a transportation unit TEi is then controlled on the basis of the logical sectors LSi, i.e. also independently of the underlying hardware of the conveying device 1. In other words, the movement profile defined on the logical sector LSi for a transportation unit TEi is run through in a control unit in order to obtain the setpoints S for the movement of the transportation unit TEi. The allocated movement profile is run through for each transportation unit TEi which travels into the logical sector LSi. The setpoints S are still based here on the logical sector LSi, for example in the form of position in the logical sector LSi in relation to the starting point SPi of the logical sector LSi, i.e. a position in the region [SPi, SPi+Li].

For the control of the movement, there is thus no need for any knowledge of the underlying hardware. The control is performed on an abstract logical sector LSi in accordance with a defined movement profile. The movement profile is run through preferably in the form of position setpoints. The logical sector can then be considered to be a simple linear axis. The ascertained setpoints S are then converted with the underlying allocation to conveying segments FSi into setpoint selections for the hardware. It is therefore possible to apply a movement defined in the form of a series of logical sectors LSi to different hardware. The defined movement does not have to be altered, merely the allocation between logical sectors LSi and the hardware has to be recreated. This can be implemented very easily via a graphical user interface, on which the specific hardware is displayed and which is then superimposed by the logical sectors LSi. By that, the allocation results automatically.

Figure 4:
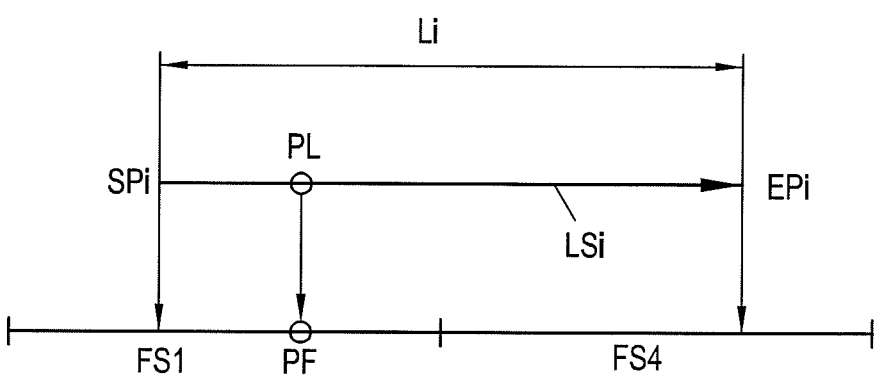
FIG. 4 shows the allocation between logical sector and actual hardware.

The movement profile run through on the logical sector LSi is implemented on the specific hardware of the conveying device 1 in that the associated conveying segments FSi for each logical sector LSi are stored. A logical sector LSi is therefore assigned to a conveying segment, part of a conveying segment, or a plurality of conveying segments (which also includes parts of conveying segments FSi). Any position PL of the logical sector LSi is also uniquely allocated to a position PF on the allocated conveying segment(s) FSi. If conveying segments are arranged on both sides (with respect to the conveying direction) of the conveying line 2, for example in the region of a switch W or at the conveying segments FS9 to FS13 in FIG. 2, the position PL of the logical sector LSi is then of course allocated to the conveying segments FSi on both sides. Any position PL on the logical sector LSi can thus be allocated to a position PF on a specific conveying segment FSi, or a plurality of conveying segments FSi, as is illustrated in FIG. 4. The setpoint S at the position PL on the logical sector LSi can therefore be converted into a setpoint at the position PF on the actual hardware. This allocation can be implemented easily for example via the known length Li of the logical sector LSi and the known length of the allocated hardware, i.e. of the conveying segment(s) FSi. The length of the conveying segment FSi allocated to a logical sector LSi is preferably equal to the length Li of the logical sector LSi, since this facilitates the allocation.

If, for example, two conveying segments FSi each having a length of 500 mm are allocated to the logical sector LSi, a length 1000 (without unit since it is independent of the hardware) is preferably assumed for the length Li of the logical sector LSi. A position PL on the logical sector LSi thus can be uniquely allocated to a position on the conveying segments FSi. A position PL in the region of [0, 500] on the logical sector LSi would then be allocated to a position PF on the first conveying segment FSi in the region of [0, 500]. A position PL in the region of [500, 1000] on this logical sector LSi would then be allocated a position PF on the second conveying segment FS2 in the region of [0, 500]. If, for example, a speed is specified as setpoint S at the position PL, this then gives the specification of the speed at the position PF of the allocated conveying segment FSi. The conveying segment FSi or the allocated segment control unit 4 can allocate the position PF to certain driving coils ASij, which are then actuated so as to adjust the new setpoint S.

With implementation on the actual hardware, a switch release can also be stored in the allocation of logical sector LSi to conveying segments FSi in order to correctly switch a possible switch W in the path of the logical sector LSi. In the example according to FIG. 3, the information that the switch W on the conveying segment FS4 is to be switched over would thus also be contained in the allocation between the logical sector LSi and the conveying segments FS1, FS4. The switch W merely has to be switched at the correct time so that the transportation unit TEi follows the intended path along the conveying line 2. The time at which the switch is switched can be defined for example by the segment control unit 4, for example when the transportation unit TEi travels into the logical sector LSi and the switch W is not occupied by another transportation unit. When planning the logical sectors LSi, the user thus also does not need to take into account any necessary switch positions. When assigning a logical sector LSi to the conveying line 2, it is recognized that a switch W is present and also how the switch should be positioned.

The length Li of a logical sector LSi could also be altered. i.e. made shorter or longer, during the planning stage with use of a predefined logical sector LSi. However, it should be noted here that a movement profile defined for this sector can then also change. If a logical sector LSi is extended, then a movement profile defined therein is also extended for example. If the logical sector LSi is to be travelled through within a specific time, the speed should be increased consequently in order to travel through the logical sector LSi, which is now longer, in the same time. Such adaptations, however, can be taken into account easily during the planning.

With each cycle step of the setpoint selection, which can match the cycle step of the control, a new setpoint S is calculated for a transportation unit TEi in a logical sector LSi from the associated defined movement profile. The location of the transportation unit TEi in the actual conveying device 1 is known on the basis of the allocation between logical segment LSi and conveying segment FSi. The current setpoint S for the conveying segment FSi can thus be transferred to the allocated segment control unit 4 of the conveying segment FSi, or the conveying segments FSi. The setpoint for the conveying segment FSi is then adjusted by the segment control unit 4.

The invention could be implemented on the basis of the following procedure:

A conveying line 2 is firstly planned with predefined conveying segments FSi, as illustrated in FIG. 1 by way of example, or a planned conveying line 2 is provided. This is realized preferably on a graphical user interface. At least part of the conveying line 2 is then assigned a number of logical sectors LSi, wherein the allocation between the logical sectors LSi and the conveying segments FSi is stored. The assignment of the logical sectors LSi is preferably performed likewise on a graphical user interface. At least one logical sector LSi is created. A movement profile is allocated to each logical sector LSi for the transport units TEi that are to be moved along the logical sector LSi. The movement of a transportation unit TEi is controlled on the logical sectors LSi by determining a setpoint S for the logical sector LSi in each cycle step from the associated movement profile. The setpoint S is adjusted on the conveying device 1 on the basis of the allocation to the conveying segments FSi.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for controlling the movement of a transportation unit of a conveying device, which is formed as a long-stator linear motor, the method comprising:
    moving the transportation unit along a conveying line, which comprises a number of conveying segments;
    assigning at least part of the conveying line, along which the transportation unit is moved, at least one logical sector;
    allocating the at least one logical sector to one or more conveying segments or parts thereof;
    allocating a movement profile for the transportation unit to the at least one logical sector;
    moving the transportation unit in accordance with the specified movement profile along the at least one logical sector to ascertain a setpoint of the movement in a setpoint selection cycle step; and
    transferring the setpoint to the one or more conveying segments, or parts thereof,
    wherein the movement of the transportation unit, which is controlled on the basis of the logical sectors, is independent of underlying hardware of the conveying device.

2. A method for controlling the movement of a transportation unit of a conveying device, which is formed as a long-stator linear motor, the method comprising:
    moving the transportation unit along a conveying line, which comprises a number of conveying segments;
    assigning at least part of the conveying line, along which the transportation unit is moved, at least one logical sector;
    allocating the at least one logical sector to one or more conveying segments or parts thereof;
    allocating a movement profile for the transportation unit to the at least one logical sector;
    moving the transportation unit in accordance with the specified movement profile along the at least one logical sector to ascertain a setpoint of the movement in a setpoint selection cycle step; and
    transferring the setpoint via the allocation to the one or more conveying segments, or parts thereof,
    wherein the logical sector comprises a starting point, an end point, and a length.

3. The method according to claim 2, wherein any position between the starting point and the end point of the logical sector corresponds to a unique position on an allocated conveying segment or a number of allocated conveying segments.

4. The method according to claim 1, further comprising allocating to the logical sector a movement profile, which is run through by each transportation unit on the logical sector.

5. The method according to claim 1, further comprising allocating to the logical sector different movement profiles for different transportation units.

6. The method according to claim 1, wherein the allocation between the logical sector and a conveying segment also contains information regarding a necessary switch position of a switch.

7. The method according to claim 2, further comprising allocating to the logical sector a movement profile, which is run through by each transportation unit on the logical sector.

8. The method according to claim 2, further comprising allocating to the logical sector different movement profiles for different transportation units.

9. The method according to claim 2, wherein the allocation between the logical sector and a conveying segment also contains information regarding a necessary switch position of a switch.

10. The method according to claim 2, wherein the moving of the transportation unit in accordance with the specified movement profile along the at least one logical sector ascertains a new setpoint of the movement in each cycle step of the setpoint selection.

11. The method according to claim 2, wherein the movement of the transportation unit is achieved without knowledge of underlying hardware of the conveying device.

12. The method according to claim 11, wherein the underlying hardware of the conveying device comprises the conveying segments.

13. The method according to claim 1, wherein the moving of the transportation unit in accordance with the specified movement profile along the at least one logical sector ascertains a new setpoint of the movement in each cycle step of the setpoint selection.

14. The method according to claim 1, wherein the movement of the transportation unit is achieved without knowledge of the underlying hardware of the conveying device.

15. The method according to claim 14, wherein the underlying hardware of the conveying device comprises the conveying segments.

* * * * *